United States Patent Office 3,366,629
Patented Jan. 30, 1968

3,366,629
ALKALOIDS OF *MITRAGYNA CILIATA*
Arnold Heyworth Beckett, Bromley, England, assignor to Smith Kline & French Laboratories, Philadelphia, Pa., a corporation of Pennsylvania
No Drawing. Filed June 5, 1964, Ser. No. 373,080
Claims priority, application Great Britain, July 16, 1963, 28,189/63
3 Claims. (Cl. 260—236)

This invention relates to new crystalline products of manufacture, more specifically crystalline alkaloids produced from leaves of *Mitragyna ciliata*, a plant of the Rubiaceae family. These alkaloids have useful antitussive and analgetic activity.

The new crystalline alkaloids called ciliaphylline, mitraciliatine and rhynchociline are produced from the dried powdered leaves of *Mitragyna ciliata* by extraction with alcohol. The concentrated, syrupy extract is acidified with glacial acetic acid and diluted with water. The filtered acid solution is made alkaline with ammonia and extracted with chloroform. The extract yields a residue of crude alkaloids which are fractionally separated as described in detail in Example 1.

Ciliaphylline is a crystalline alkaloid, $C_{23}H_{30}N_2O_5$ melting at 222–223° C. It is soluble in acetone, chlorobenzene, chloroform and ethanol; slightly soluble in ether; and insoluble in sodium hydroxide.

Mitraciliatine is a crystalline alkaloid, $C_{23}H_{30}N_2O_4$ melting at 140–141° C. It is soluble in acetone, chloroform, ethanol and ether, and insoluble in light petroleum and sodium hydroxide.

Rhynchociline is a crystalline alkaloid, $C_{23}H_{30}N_2O_5$ melting at 178–180° C. It is soluble in acetone, chloroform, ethanol and ether, and insoluble in n-hexane, light petroleum and sodium hydroxide.

The new crystalline alkaloids of this invention are orally effective analgetic and antitussive agents as shown by animal experimentation. The nontoxic pharmaceutically acceptable acid addition salts of these alkaloids are also included within the scope of this invention since such salts are likewise effective for use as antitussive and analgetic agents. Both inorganic and organic acids can be employed to form pharmaceutically acceptable salts, illustrative acids being sulfuric, nitric, phosphoric, citric, acetic, lactic, tartaric, ethanedisulfonic, sulfonic, maleic, hydrochloric, hydrobromic, benzoic and the like. These salts are prepared by methods known to the art.

For therapeutic use the alkaloids may be formulated into pharmaceutical compositions comprising a carrier and a crystalline alkaloid or a nontoxic acid addition salt thereof in an amount sufficient to produce antitussive and analgetic activity. The pharmaceutical carrier employed in these compositions can be either solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil or an ethylene glycol. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used, the compositions can be tabletted, used as a pharmaceutical powder, placed in a hard gelatin capsule or in the form of a troche or lozenge. If a liquid carrier is used, the composition can be in the form of a soft gelatin capsule.

The crystalline alkaloids or a nontoxic organic or inorganic acid addition salt thereof, preferably with a nontoxic pharmaceutical carrier such as described above, are orally or parenterally administered to animals in pain or coughing in divided doses in dosage units.

The advantages afforded by the compositions containing per dosage unit the desired therapeutically useful amount of these alkaloids and their administration to animals are obvious. These compositions can be prepared containing exact amounts of these alkaloids by virtue of their pure crystalline state. The uniformity and standardization of the desired analgetic and antitussive effects as produced by the crystalline alkaloids is not possible with either the whole plant material of *Mitragyna ciliata* or crude extracts thereof.

The following example sets forth the extraction procedure in detail for producing the crystalline alkaloids of this invention.

*Example 1.—Isolation of Alkaloids*

Dried, powdered leaves of *Mitragyna ciliata* (12 kg.) are extracted by refluxing with 96% alcohol and the extract is evaporated under reduced pressure to a thin syrup. After acidifying with glacial acetic acid and diluting with a large volume of water, the precipitated non-alkaloidal material is filtered off. This is dissolved in ethanol and treated with 5% acetic acid. The acid washings are added to the filtrate which is made alkaline with ammonia and extracted with chloroform. The extract is washed, dried and evaporated to give the total crude alkaloids (37 g.).

The crude alkaloids are dissolved in dilute sulfuric acid and after extracting with ether the solution is made alkaline with ammonia and re-extracted with ether. The ethereal extract is washed, dried and concentrated to yield 12.9 g. of crude ciliaphylline, melting point 212–214° C. Recrystallization of the picrate and regeneration of the free base gives prismatic crystals, melting point 222–223° C.

Mixtures of ciliaphylline and rotundifoline (known alkaloid) are isolated from the mother liquors and are separated by absorption and elution through alumina with 10% chloroform in ether followed by chloroform to give rotundifoline (4.9 g.) melting point 230° C. and crude ciliaphylline (1.3 g.) melting point 213° C.

The remaining mother liquor is exhaustively extracted with 5% sodium hydroxide. The alkaline extract is acidified with sulfuric acid, made alkaline with ammonia and extracted with ether. The ether extract is extracted with 5% sodium hydroxide and the resultant alkaline solution is saturated with carbon dioxide to give a precipitate which is extracted with ether. Evaporation of the solvent gives colorless prisms of isorotundifoline (2.3 g.) melting point 131° C., a known alkaloid.

The ethereal mother liquor, after the alkaloid extraction, is washed free from alkali with distilled water and evaporated to give a residue which is dissolved in chloroform and extracted with 5% hydrochloric acid. The chloroform solution yields a pale yellow residue which on recrystallization from light petroleum 40/60°-ether (1:1) gives fine sandy crystals (1.3 g.) melting point 141° C. of mitraciliatine.

The total acid extracts and washings are made alkaline with ammonia and extracted with ether. This extract is evaporated to yield a residue which is shown by thin layer chromatography to contain two alkaloids different from those previously isolated. A chloroform solution of the perchlorate salts of these alkaloids is added to a column of alumina and the alkaloid eluted with 10% chloroform in ether followed by chloroform. Early fractions contain both alkaloids but later fractions contain a base, rhynchociline, which is isolated as colorless silky needles (5.5 g.) melting point 178–180° C.

The mixed eluates containing both alkaloids are evaporated to dryness and the residue dissolved in ether, the solution added to a column of alumina and the alkaloids eluted with 1% chloroform in ether. Repeated treatment in this manner of the bulk fractions containing both alkaloids results in the isolation of isorhynchophylline (a known alkaloid) which crystallizes with difficulty from n-hexane-ether (1:1) to give needles (2.7 g.) melting point 144° C.

*Characterization of the alkaloids*

Ciliaphylline:
$[\alpha]_D^{25.5} -89.5°$ (C, 0.65 in chloroform)
pKa: 7.5 (in water); (6.5 in 80% methylcellosolve)
Found: C, 66.55; H, 7.7; N, 7.21; $OCH_3$, 21.31; equivalent weight 390.
$C_{23}H_{30}N_2O_5$ requires C, 66.64; H, 7.3; N, 6.76; $OCH_3$, 22.44%; equivalent weight 414.
Ultraviolet absorption:
λ max (EtOH), 222 mμ (Log ε=4.44) 244 mμ (Log ε=4.24) 287 mμ (Log ε=3.46) λ min 234 mμ (Log ε=4.20) 276 mμ (Log ε=3.40).
Infrared absorption:
ν max (Nujol) 1728, 1705, 1640, 1620, 1500, 1380, 1335, 1240, 1160 (split) 1100, 1040, 995, 965, 925, 850, 785, and 775 reciprocal centimeters. Picrate, melting point 130–131° C.

Rhynchociline:
$[\alpha]_D^{20} +6.2°$ (C=2 in chloroform)
Found: C, 66.58; H, 7.7; N, 7.0; $OCH_3$, 21.8; equivalent weight 387.
$C_{23}H_{30}N_2O_5$ requires C, 66.64; H, 7.3; N, 6.76; $OCH_3$, 22.44%; equivalent weight 414.
pKa 6.7 (Electrometric titration in 80% methylcellosolve), 8.5 Electrometric titration in water.
Ultraviolet absorption:
λ max (Ethanol) 225 mμ (Log ε=4.41) 242 mμ (Log ε=4.24) 286 mμ (Log ε=3.48), λ min 235 mμ (Log ε=4.22) 277 mμ (Log ε=3.39).
Infrared absorption:
ν max (Nujol) 3525 (weak) 3100, 1685, 1605, 1270, 1240 (split) 970 (weak) 780, 730 reciprocal centimeters.
The *perchlorate*, colorless needles melting point 221–223° C.

Mitraciliatine:
Found: C, 68.84; H, 7.97; N, 6.83; $OCH_3$ 22.70; equivalent weight 405.
$C_{23}H_{30}N_2O_4$ requires C, 69.34; H 7.55; N, 7.04; $OCH_3$, 23.37%; equivalent weight 398.
Ultraviolet absorption:
λ max (Ethanol) 228 mμ (Log ε=4.59) 292.4 mμ (Log ε=3.91) shoulders 248.8 mμ (Log ε=4.17) 284 mμ (Log ε=3.89) λ min 289 mμ (Log ε=3.84).
Infrared absorption:
ν max (Nujol) 3150, 1690, 1245, 1105, 770, 750, reciprocal centimeters.
The *perchlorate*, yellow prisms melting point 229–230° C.
Found: C, 55.26; H, 6.28; N, 5.62; $OCH_3$, 17.32.
$C_{23}H_{30}N_2O_4 \cdot HClO_4$ requires C, 55.38; H, 6.2; N, 5.63; $OCH_3$, 18.66.
Infrared absorption:
ν max (Nujol) 3350, 3025, 2600, 1690, 1245, 770, 740, 730 reciprocal centimeters.

What is claimed is:
1. Ciliaphylline, a crystalline substance analyzing for the empirical formula $C_{23}H_{30}N_2O_5$, being characterized by:
a melting point of 222–223° C.;
an optical rotation as follows:
$[\alpha]_D^{25.5°} = -89.5°$ (concentration=0.65% in chloroform);
an ultraviolet absorption spectrum in ethanol with the following maxima:
λ max 222 mμ (log ε=4.44),
λ max 244 mμ (log ε=4.24) and
λ max 287 mμ (log ε=3.46)
and the following minima:
λ min 234 mμ (log ε=4.20) and
λ min 276 mμ (log ε=3.40);
an infrared absorption spectrum in a hydrocarbon oil with bands at the following wavelengths, expressed in reciprocal centimeters: 1728, 1705, 1640, 1620, 1500, 1380, 1335, 1240, 1160 (split), 1100, 1040, 995, 965, 925, 850, 785 and 775; and
a picrate salt having a melting point of 130–131° C.

2. Rhynchociline, a crystalline substance analyzing for the empirical formula $C_{23}H_{30}N_2O_5$, being characterized by:
a melting point of 178–180° C.;
an optical rotation as follows:
$[\alpha]_D^{20°} = +6.2°$ (concentration=2% in chloroform);
an ultraviolet absorption spectrum in ethanol with the following maxima:
λ max 225 mμ (log ε=4.41),
λ max 242 mμ (log ε=4.24) and
λ max 286 mμ (log ε=3.48)
and the following minima:
λ min 235 mμ (log ε=4.22) and
λ min 277 mμ (log ε=3.39);
an infrared absorption spectrum in a hydrocarbon oil with bands at the following wavelengths, expressed in reciprocal centimeters: 3525 (weak), 3100, 1685, 1605, 1270, 1240 (split), 970 (weak), 780 and 730; and
a perchlorate salt having a melting point of 221–223° C.

3. Mitraciliatine, a crystalline substance analyzing for the empirical formula $C_{23}H_{30}N_2O_4$, being characterized by:
a melting point of 141° C.;
an ultraviolet absorption spectrum in ethanol with the following maxima:
λ max 228 mμ (log ε=4.59) and
λ max 292.4 mμ (log ε=3.91),
shoulders at:
248.8 mμ (log ε=4.17) and
284 mμ (log ε=3.89)
and a minimum at:
λ min 289 mμ (log ε=3.84);
an infrared absorption spectrum in a hydrocarbon oil with bands at the following wavelengths, expressed in reciprocal centimeters: 3150, 1690, 1245, 1105, 770 and 750; and
a perchlorate salt having:
a melting point of 229–230° C.; and
infrared absorption bands at wavelengths of 3350, 3025, 2600, 1690, 1245, 770, 740 and 730 reciprocal centimeters.

References Cited

Beckett et al.: Jour. Pharmacy and Pharmacology, vol. 15 Supp. (December 1963) p. 158T.
Beckett et al.: Jour. Pharmacy and Pharmacology, vol. 15 Supp. (December 1963) pp. 166T–169T.

JAMES A. PATTEN, *Primary Examiner.*

JOHN D. RANDOLPH, WALTER A. MODANCE, *Examiners.*